Nov. 17, 1936.  F. J. KOHUT  2,061,198
JOINT ASSEMBLY
Filed Oct. 16, 1935   2 Sheets-Sheet 1
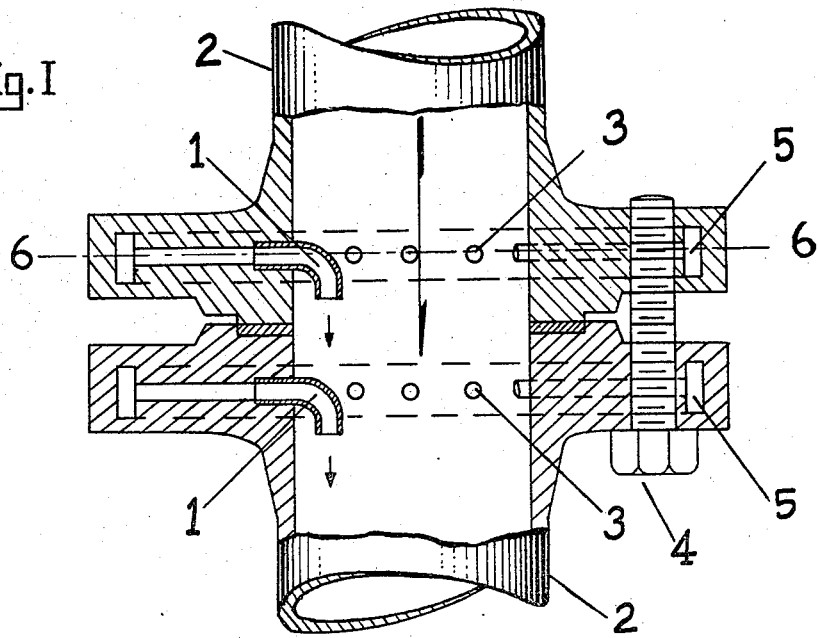
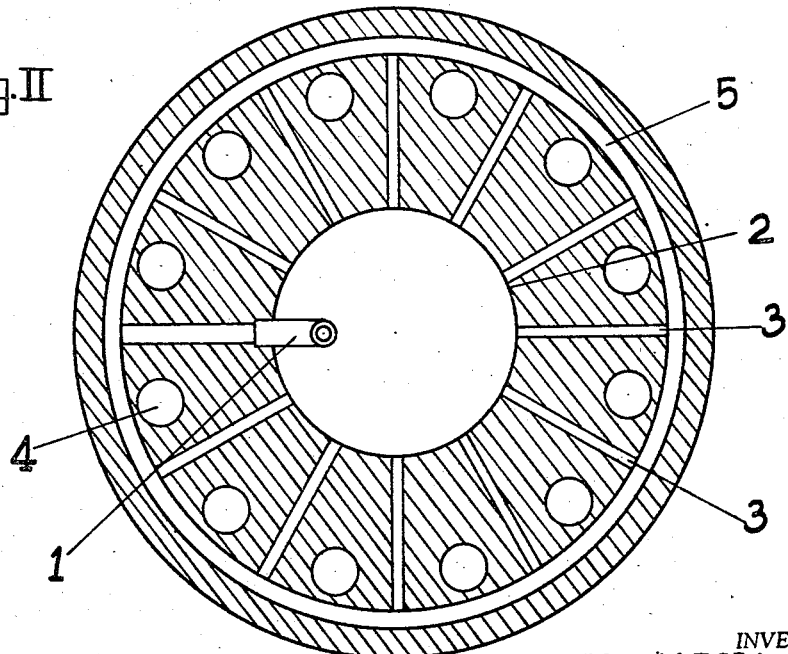
INVENTOR.
Frank J. Kohut
BY
Allan R Plumley
ATTORNEY.

Nov. 17, 1936.    F. J. KOHUT    2,061,198
JOINT ASSEMBLY
Filed Oct. 16, 1935    2 Sheets-Sheet 2
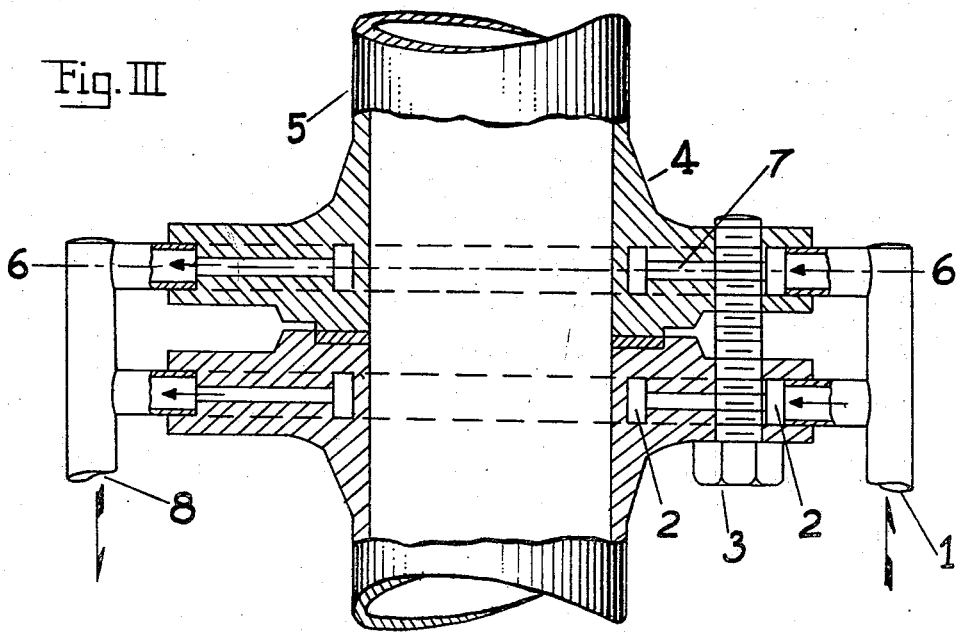
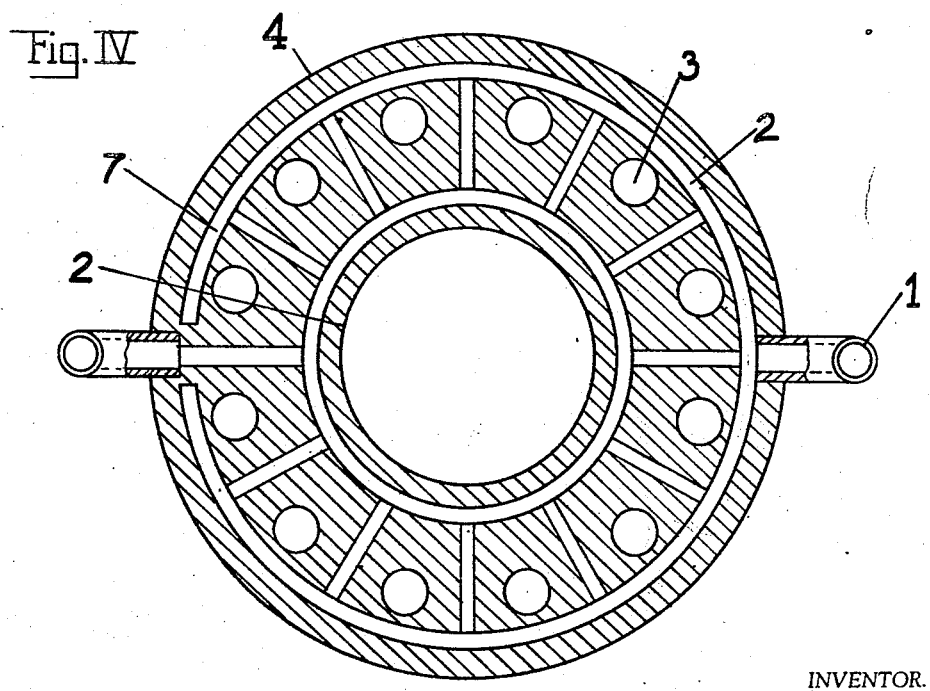
INVENTOR.
Frank J. Kohut
BY
Allan R. Plumley
ATTORNEY.

Patented Nov. 17, 1936

2,061,198

UNITED STATES PATENT OFFICE 2,061,198

JOINT ASSEMBLY

Frank J. Kohut, Baltimore, Md.

Application October 16, 1935, Serial No. 45,249

2 Claims. (Cl. 285—139)

This application relates to improved joints, connections, couplings, unions and the like, and more particularly to improvements in flanged pipe joints adapted for use in systems which involve handling fluids (liquids, gases, steam, and/or vapors) at elevated pressures and/or temperatures.

It is known that systems of piping or assemblies of apparatus involving the handling of fluids at elevated pressures and/or temperatures must be so constructed as to accommodate the movement in such systems or assemblies which is set up by temperature differentials.

It is also known that simultaneously with the flexibility necessary to accommodate such movement, there must be sufficient mechanical rigidity to withstand the internal pressure and bending loads. Ideally these two seeming opposites must be accomplished without overstressing elements comprising the system or assembly and without altering the relative position of the parts.

In the simple flanged pipe joint, for example, utilized in a system which conveys a hot fluid, there is a flow of heat outward from the surface in contact with the fluid, through the material of the joint, to the outermost edges of the flanges. The temperature differential which is thus set up between the parts of the joint causes unequal expansion between various sections, resulting in superimposing additional stress upon the high initial tension in the bolts. The sealing surfaces of the joint are consequently often greatly distorted.

A further problem involved in pipe joints flanged and otherwise, resides in the difficulty, if not impossibility, of determining the stresses set up in various elements of the joint. Non-uniformity of temperature in the various elements of the joint, as well as any changes in temperature of the fluid being handled simply add to the difficulty of the problem.

It is an object of the present invention to overcome these disadvantages and to provide a new and improved joint.

Other objects and advantages of this invention will be apparent by reference to the following specification, and the accompanying drawings, in which the details and preferred embodiments thereof are described and illustrated.

Figure I represents a cut away section of the joint assembly of this invention whereas Figure II represents a cross section of the joint assembly of Figure I at the line 6—6 of Figure I. Figure III represents a cut away section of a modified joint assembly of this invention wherein tempering fluid may be introduced through conduits (I) from a source outside of the system. Figure IV represents a cross section of the joint assembly of Figure III on the line 6—6 of Figure III.

According to the present invention the effect of temperature differential caused by the flow of heat through the material of a joint assembly is greatly minimized, if not wholly overcome, by providing avenues for, and means to establish, an actual flow of a tempering fluid through the joint assembly. The tempering fluid which flows through the assembly may, according to this invention, be the fluid being handled in the apparatus, vessel or system of which the joint forms a part, or it may be an independent fluid which is maintained at the same or differing pressure and/or temperature. In like manner the flow through the avenues of the joint assembly may, according to this invention, be proportional to or independent of the flow of the fluid in the apparatus of which the joint forms a part. Thus, referring to Figure I, which is a cut away section of a joint assembly of this invention and also referring to Figure II which is a cross section on line 6—6 of Figure I, small nozzles of ejecting means (I), are placed in the stream of flow of the fluid being handled, at points of high velocity and with their exits pointed in the direction of flow of the fluid. The passage of the fluid in the pipe (2) over and around the nozzles (I) draws the tempering fluid, in this case the fluid being handled in the system, into the radial holes or paths (3), which are located between the studs or bolts (4), thence through the annulus (5) and finally through said nozzles (I) into the stream of fluid passing through the pipe (2).

The cross sectional area of each of the several radial holes or paths (3) may be varied with respect to their location relative to the nozzles or ejectors (I) in order to obtain similar flow through all of them. Also, the number of radial paths (3) and the number of annular spaces provided in the parts comprising the joint assembly may be varied with change in size and form of the joint assembly or for other reasons.

Many variations may be made in the form of the joint of this invention. Thus, a somewhat simpler form of this invention is illustrated by Figure III which is a cut-away section of a joint assembly similar to that previously described in connection with Figures I and II. Figure IV is a cross section on line 6—6 of Figure III. The modification illustrated by Figures III and IV is preferably for application in instances wherein it is desired to use a tempering medium which is independent of the fluid contained in the piping system or apparatus. In such an arrangement or modification the flow of the tempering medium is induced and controlled by external means not shown and the pressure and temperature of such medium may differ from and be independent of the fluid in the system of which the joint or flange is an element.

The tempering medium is introduced through a conduit (1) or conduits, into the annulus (2) through which it may be forced to circulate completely about and adjacent to the studs or bolts (3) to temper all the parts forming the flange (4) surrounding or integral with the pipe (5). After passing through the annulus (2) and through the radial paths (7) the tempering fluid is led out through the conduit (8) or conduits for recycling, cooling or heating or for whichever disposal desired.

The conveying of the tempering or controlling fluid through the joint assembly, to the outermost part thereof as well as adjacent to the studs or bolts which carry the stress in the assembly reduces the temperature differential to a negligible quantity.

It will be apparent that in this last described modification as well as in the first a greater or lesser plurality of conduits, radial paths, annuli and the like may be utilized if desired, dependent in part at least upon the size of the joint.

I claim:

1. A flanged joint assembly comprising separate joint sections each containing at least one avenue in the body of each section thereof adapted for flow of fluid therethrough, means, situated in the main line of fluid flow through said joint assembly, adapted to set up flow of fluid through said avenues and means for holding said joint portions together.

2. A flanged joint assembly comprising separate joint sections which contain a plurality of avenues in the body of the joint section adapted for flow of fluid therethrough, a plurality of means for holding said sections together and means in the interior of said joint sections adapted for setting up flow of liquid, passing through said joint assembly, through said avenues.

FRANK J. KOHUT.